April 26, 1960  E. G. HILL  2,934,381
BOOSTER BRAKE SYSTEM
Filed Jan. 28, 1959  3 Sheets-Sheet 1

INVENTOR.
EDWARD GOVAN HILL
BY John V. Phillips
ATTORNEY

April 26, 1960   E. G. HILL   2,934,381
BOOSTER BRAKE SYSTEM
Filed Jan. 28, 1959   3 Sheets-Sheet 2

INVENTOR.
EDWARD GOVAN HILL
BY
ATTORNEY

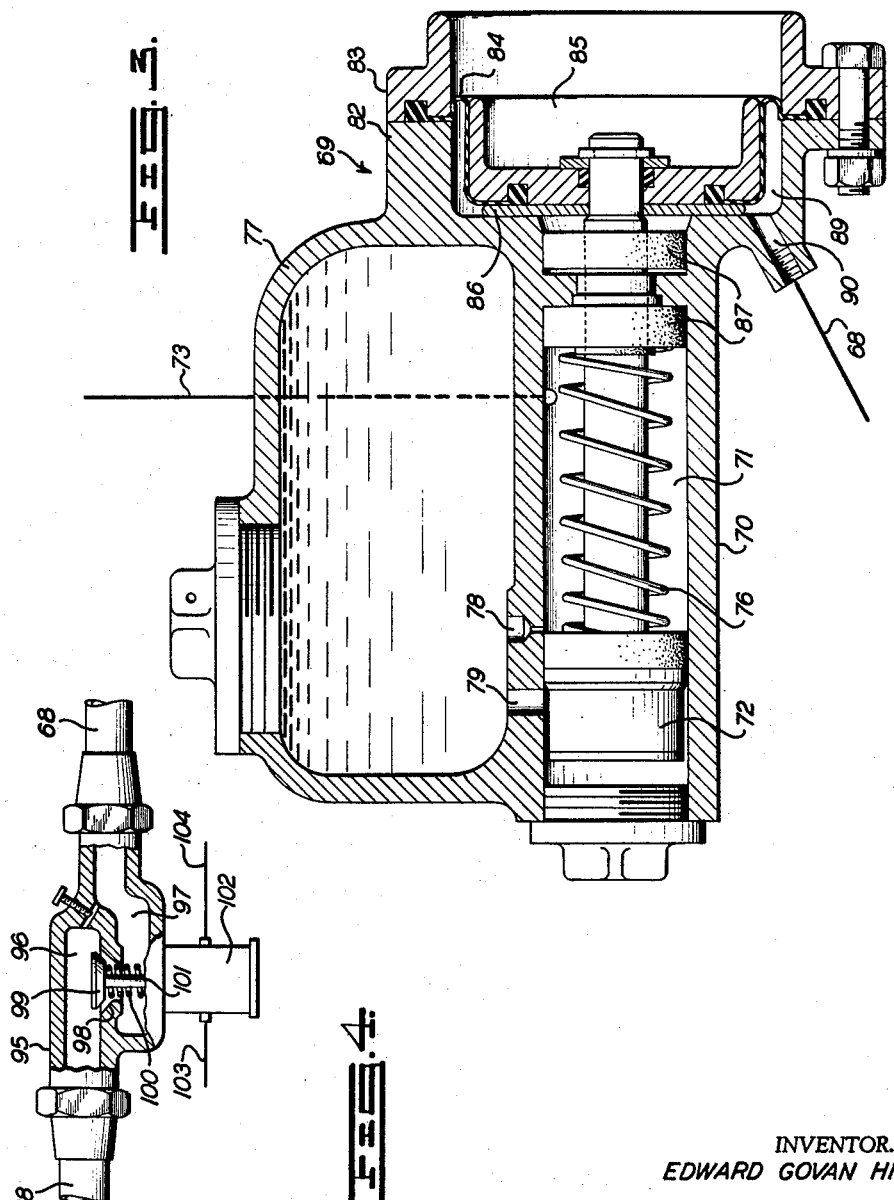

United States Patent Office 2,934,381
Patented Apr. 26, 1960

2,934,381

BOOSTER BRAKE SYSTEM

Edward Govan Hill, Birmingham, Mich., assignor to Kelsey-Hayes Company, Detroit, Mich., a corporation of Delaware Application January 28, 1959, Serial No. 789,722

14 Claims. (Cl. 303—24)

This invention relates to a booster brake system for motor vehicles.

As shown, for example, in my Patent No. 2,876,044, granted March 3, 1959, it has been proposed to provide a motor vehicle brake system wherein a dual motor arrangement is used having separately operable pressure responsive pistons or the like, respectively connected to fluid displacing plungers for displacing braking fluid separately to the front and rear wheels of a motor vehicle, and to control, in accordance with the rate of vehicle deceleration, the maximum energization of the rear wheel booster motor to prevent the rear wheels from locking and sliding. In my prior patent referred to, the front and rear booster motors are controlled by a single pedal operated follow-up control valve mechanism, and an inertia controlled valve is arranged between the follow-up control valve mechanism and the rear booster motor. In such prior system, vacuum motors are employed, and the inertia controlled valve, in response to a given rate of vehicle deceleration, will limit the admission of air to the rear fluid motor to prevent the locking of the rear wheels, as stated. This is highly advantageous since, as is well known, the locking and sliding of the rear wheels greatly reduces the effective braking action, whereas the prevention of the locking of the rear wheels maintains traction between such wheels and the highway surface to render the braking action more efficient. With such a system it is possible to bring a vehicle to a stop from a given relatively high speed in a shorter distance than is possible if the rear wheels are permitted to lock.

With the system of my prior patent mentioned above, highly advantageous results of the character referred to are attained. However, the rate of vehicle deceleration utilized for limiting energization of the rear wheel motor is always the same. It will be apparent that the rate of vehicle deceleration utilized for limiting energization of the rear wheel motor must be such that prevention of the locking of the rear wheels will be accomplished when the vehicle is relatively lightly loaded. When the vehicle is more heavily loaded, the rear wheels are capable of withstanding substantially greater braking forces without locking, and such condition is not taken care of in the structure of the prior patent referred to.

An important object of the present invention is to provide a system of the character generally referred to wherein a rate of vehicle deceleration is utilized for limiting energization of the rear wheel braking motor, and to provide means for utilizing different rates of deceleration for this purpose in accordance with the loading of the vehicle.

A further object is to provide such a system which is particularly adapted for use on passenger vehicles utilizing air suspension means rather than springs in which the air suspension units are conventionally provided with means for controlling the air pressure therein in accordance with the loading of the vehicle, and to utilize variations in the pressures in the rear wheel air suspension means for controlling the rate of vehicle deceleration at which energization of the rear wheel braking motor is arrested.

A further object is to provide a system of this character wherein a mercury switch controls the rate of vehicle deceleration at which the rear wheel braking motor has its energy cut off, and to provide means for moving the mercury switch to increase the rate of vehicle deceleration necessary for limiting energization of the rear wheel braking motor as vehicle loads increase.

A further object is to provide a system of the character just referred to wherein the mercury inertia switch is biased to a normal position to function in accordance with relatively light vehicle loads, and to utilize increased air pressures in the rear wheel air suspension devices to move the mercury switch from its biased position to increase the rate of vehicle deceleration at which the admission of air pressure into the rear wheel braking motor is limited.

A further object is to provide a booster motor for applying the front brakes of a motor vehicle and a slave motor for applying the rear vehicle brakes; to control pressure in both motors through a single valve mechanism; to connect the variable pressure chambers of the two motors through a control line, and to cut off the flow of air through said control line to the slave motor when the rate of vehicle deceleration increases above a predetermined point.

Other objects and advantages of the invention will become apparent during the course of the following description.

In the drawings I have shown one embodiment of the invention. In this showing:

Figure 3 is a similar view through the slave motor for applying the rear wheel brakes; and Figure 4 is a sectional view through the inertia controlled cut-off valve, parts being shown in elevation.

Figure 2:
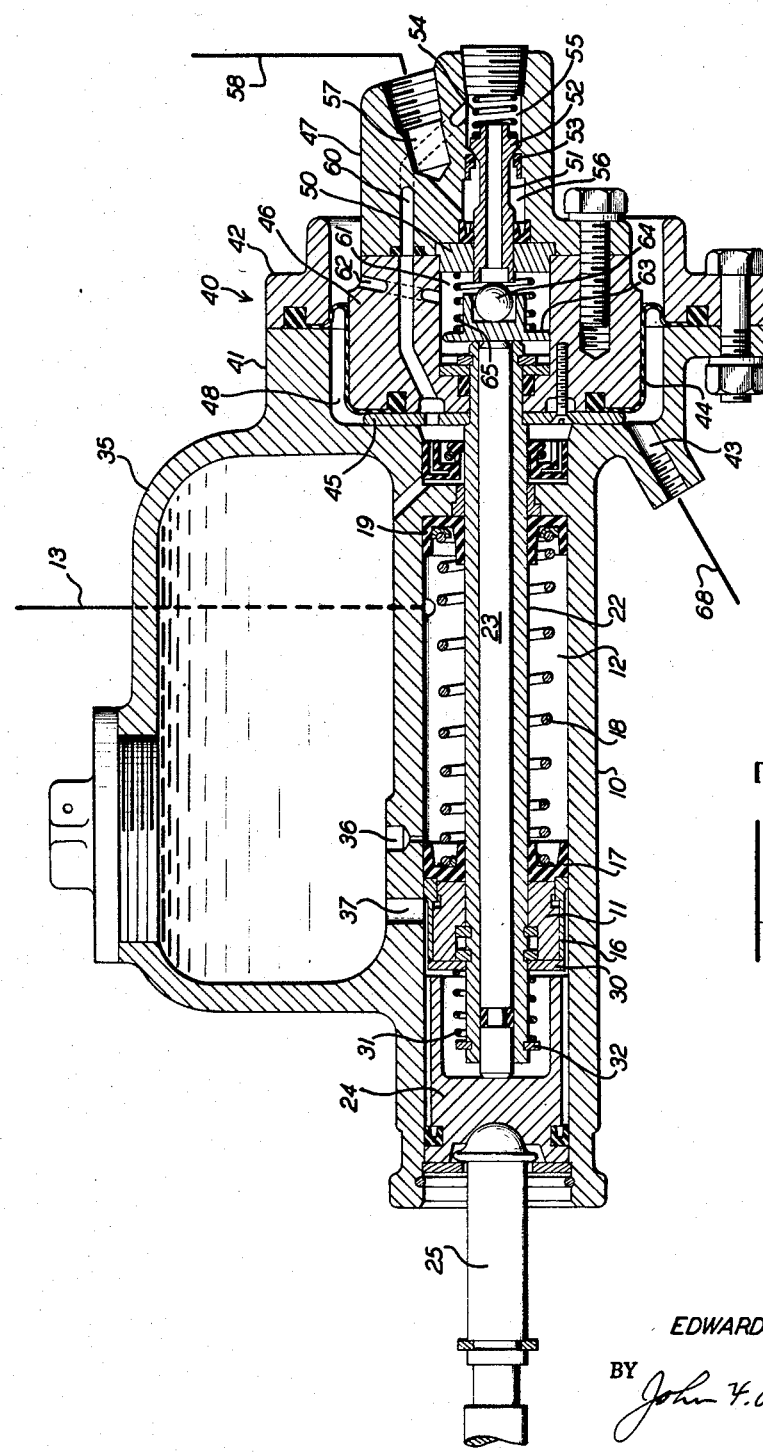
Figure 2 is an axial sectional view through a typical booster motor adapted for applying the front wheel brakes.

In Figure 2 there is shown a typical superatmospheric pressure operated booster motor adapted for use in applying the front wheel brakes. This motor per se forms no part of the present invention but is disclosed and claimed in the copending application of William Stelzer, Serial No. 696,535, filed November 14, 1957. It will become apparent that the present system is not limited to use with any particular type of booster motor, and any suitable vacuum or super-atmospheric pressure motor may be employed. The showing in Figure 2 includes the master cylinder from which fluid is displaced into the front wheel cylinders, as will become apparent.

Figure 1:
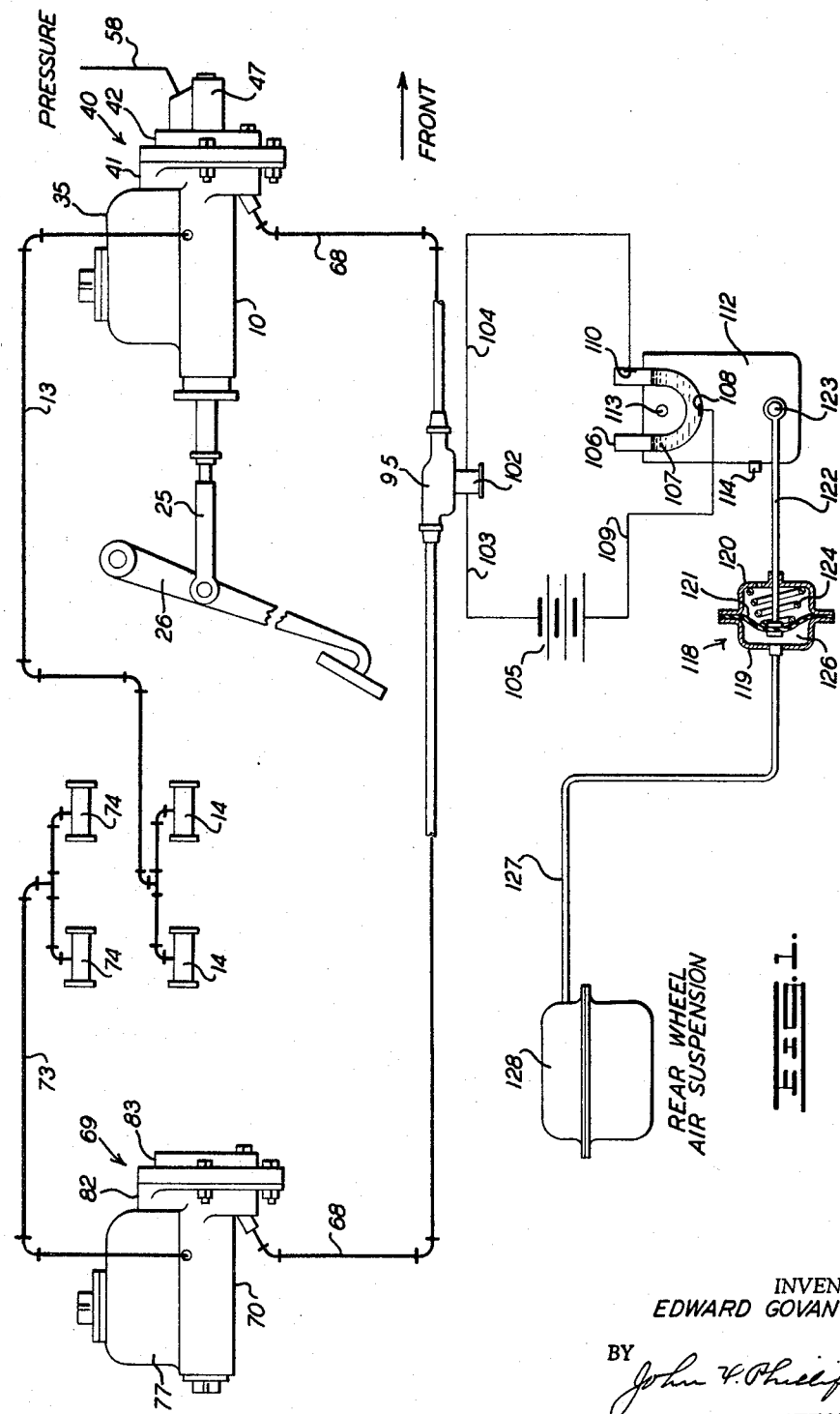
Figure 1 is a diagrammatic representation of the system as a whole, parts being shown in elevation and parts in section.

Referring to Figure 2, the numeral 10 designates a master cylinder in which is reciprocable a fluid displacing plunger 11 for displacing fluid from a master cylinder chamber 12 through a line 13 to the front wheel cylinders 14 (Figure 1). The plunger 11 in the present case includes a reaction sleeve 16, and against the right-hand end of the plunger assembly is arranged a sealing cup 17 urged to the left in Figure 2 by a spring 18, the other end of which engages a seal 19.

The plunger 11 is shown in the present instance as being connected to a tubular piston rod 22 in which is slidable a valve operating rod 23 engaging at its left-hand end in Figure 2 against a control plunger 24. This plunger is engaged and actuated by a rod 25 connected to a conventional brake pedal 26.

The sleeve 16 is maintained in its normal position relative to the plunger 11 by a plate 30 urged to the normal position shown by a spring 31 seating against a snap ring 32 carried by the piston rod 22.

The master cylinder 10 is shown as having a fluid reservoir 35 communicating with the interior of the cylinder 10 through the usual ports 36 and 37, the former of which is a replenishing port for the fluid chamber 12.

At one end of the master cylinder 10 is arranged a motor indicated as a whole by the numeral 40 and comprising casing sections 41 and 42 the former of which is preferably cast integral with the master cylinder body, and such body is provided with a passage 43 for a purpose to be described. A rolling diaphragm 44 has its periphery clamped between the sections 41 and 42 and has its inner periphery clamped by a plate 45 against a reciprocating body 46 carrying a head 47. The diaphragm 44 forms with the section 41 a variable pressure chamber 48 communicating with the passage 43.

An annular insert 50 slidably supports a tubular valve body 51 having a valve 52 at one end engaging a preferably resilient seat 53. The valve 52 is biased toward its seat by a spring 54 and controls communication between two chambers 55 and 56, the latter of which communicates through a port 57 with a line 58 leading to a source of super-atmospheric pressure.

The chamber 55 communicates through a passage 60 with the variable pressure motor chamber 48. The passage through the valve body 51 is in constant communication at one end with the chamber 55 and at its opposite end with a chamber 61 open to the atmosphere as at 62. A cap 63 engages the adjacent end of the rod 23 and houses a ball valve 64 engageable against, but normally disengaged from, the adjacent end of the tubular valve body 51. The cap 63 is biased to its normal off position as in Figure 2 by a spring 65. It will be apparent that the motor end of the tubular piston rod 22 is connected to the body 46 and has its end adjacent the cap 63 engaged therewith when the cap is in its normal off position.

The passage 43 (Figure 2) is connected to one end of a control line 68 (Figure 1) attached in a manner to be described to a slave motor indicated as a whole by the numeral 69 and shown in section in Figure 3. This motor is carried by a rear wheel master cylinder 70 having a pressure chamber 71 therein from which fluid is displaced by a plunger 72 through a line 73 to the rear wheel cylinders 74 of the vehicle. The plunger 72 is biased to its off position by a spring 76 similar to the spring 18 in Figure 2. The master cylinder 70 also is provided with a conventional reservoir 77 supplying fluid to the interior of the cylinder 70 through the usual conventional ports 78 and 79.

The motor 69 comprises surrounding sections 82 and 83, the former of which is preferably cast integral with the master cylinder 70 and reservoir 77. The peripheral portion of a rolling diaphragm 84 is clamped between the sections 82 and 83 and has its inner periphery clamped to a reciprocating body 85 by a plate 86. The plunger 72 projects through suitable seals 87 into the motor to be connected to the body 85 to transmit movement to the plunger 72 when the motor 69 is energized. The diaphragm 84 forms with the section 82 a variable pressure chamber 89 communicating through a passage 90 with the control line 68. As described below, the line 68 is normally open from end to end and accordingly the chamber 89 of the motor 69 is subject to the same pressure as the chamber 48 of the motor 40.

Referring to Figure 4, the control line 68 is provided between its ends with a valve body 95 having a pair of chambers 96 and 97 communicating respectively with opposite ends of the line 68. A valve seat 98 controls communication between the chambers 96 and 97 through the medium of a normally open valve 99, biased to open position by a spring 100. The stem 101 of the valve 99 is part of the armature of a solenoid 102 shown as having lines 103 and 104, the former of which is connected to the vehicle battery 105 (Figure 1).

A mercury switch in the form of a U-tube 106 carries a body of mercury 107 therein in constant engagement with a lower contact 108 connected by a line 109 to the second terminal of the battery 105. The forward leg of the tube 106 is provided above the level of the mercury therein with a contact 110 connected to the wire 104.

The tube 106 is carried by a plate 112 pivotally supported for turning movement on a horizontal axis 113 transversely of the vehicle. The plate 112 is adapted to turn in a counterclockwise direction from the position shown in Figure 1 and normally engages a stationary stop 114 preventing turning movement in the opposite direction beyond the normal position.

A small fluid pressure motor 118 is provided with casing sections 119 and 120 between which is clamped the periphery of a diaphragm 121 connected by a rod 122 to the plate 112, as at 123. A spring 124 in the casing section 120 biases the diaphragm 121 toward the left, thus maintaining the plate 112 in its normal position.

The casing section 120 is suitably vented to the atmosphere, while the section 119 and diaphragm 121 form a pressure chamber 126 connected to one end of a line 127. The other end of this line is shown as being connected to one of the rear wheel air suspension units 128. This unit is of conventional type wherein the weight of the vehicle body is supported by air pressure therein and is provided with weight compensating means whereby additional air pressure is introduced into the unit in accordance with increased weight loads carried by the vehicle. Therefore, it will be apparent that pressure in the chamber 126 will vary according to pressure in the air suspension unit with which it is connected.

*Operation*

All of the parts of the mechanism normally occupy the positions shown in the drawings. The motor chamber 48 (Figure 2) will be open to the atmosphere through passage 60, chamber 55, the interior bore of the valve body 51, chamber 61, and passage 62. When the brakes are to be operated, the pedal 26 will be depressed and movement of the rod 25 and plunger 24 (Figure 2) will move the rod 23 toward the right to first seat the valve 64 to close communication between the chambers 55 and 61, and then unseat the valve 52. Air under super-atmospheric pressure will flow through line 58 and port 57 into the chamber 56, thence through chamber 55 and passage 60 to the motor chamber 48. The pressure responsive unit of the motor will then move to the right to impart similar movement to the plunger 11 and associated elements to displace fluid from the chamber 12 through line 13 to the front wheel cylinders 14. This operation takes place in accordance with the disclosure in the copending application of William Stelzer, Ser. No. 696,535, referred to above. Increased pressures in the chamber 12 will deform the seal 17, transmitting movement through sleeve 16 to the plunger 24 and thence to the brake pedal to transmit hydraulic reactions to the latter, also in accordance with the disclosure of the pending application referred to.

The valve 99 is normally open, and it will be apparent that pressures built up in the motor chamber 48 will be transmitted through the line 68 to the chamber 89 (Figure 3) of the slave motor 69 to move the diaphragm 84 and body 85. Thus the plunger 72 will be moved to displace fluid from the chamber 71 through line 73 to the rear wheel cylinders 74. Hence it will be apparent that the slave motor will be operated substantially simultaneously with the booster motor 40. The two motors may be arranged in any suitable positions on the vehicle where space is available, and preferably are arranged close together to eliminate any appreciable time lag in the building-up of pressure in the chamber 89 of the slave motor when the valve mechanism of the booster motor 40 is operated.

When the booster motor 40 reaches the point of power "run-out," that is, the point of maximum energization, additional braking pressures may be supplied by added force applied to the brake pedal to assist the plunger 11 in generating pressures in the chamber 12. The generation of hydraulic pressures in the rear wheel cylinders 74 is limited by the point of power "run-out" of the motor 69, but this supplies all of the braking forces which will be required. In a passenger vehicle, it is the conventional practice to apply 40 percent of the braking forces to the rear wheels and 60 percent to the front wheels. The present system provides for such distribution of braking forces plus whatever additional force may be generated by the pedal 26 in supplementing motor pressures in the chamber 12.

In making an emergency stop, the brake pedal 26 will be rapidly and forcibly depressed, thus providing quick maximum energization of the motor 40. The tendency of the system, of course, will be to similarly energize the slave motor 69, and if such motor is to partake of its maximum energization, the rear wheel braking forces will be sufficient to lock and slide the rear wheels, which is highly disadvantageous. Assuming that the vehicle is lightly loaded, the mercury switch tube 106 will occupy the position shown in Figure 1 with the contact 110 a given distance above the level of the mercury 107 in the right leg of the tube as viewed in Figure 1. When the rate of vehicle deceleration under the conditions described reaches a predetermined point, the inertia affecting the body of mercury 107 will cause it to move downwardly in the left leg of the tube 106 and upwardly in the right leg to establish electrical engagement between the mercury 107 and contact 110. A circuit thereupon will be closed through the solenoid 102, thus closing the valve 99 and stopping the flow of pressure air through the line 68 to the slave motor 69. Thus the flow of air into the chamber 89 will be arrested before energization of the slave motor reaches the point where it is capable of locking the rear vehicle wheels. Accordingly, traction will be maintained between such wheels and the highway to provide for maximum efficiency in the brake operation.

The rate of vehicle deceleration at which the valve 99 will be closed when the vehicle is lightly loaded is substantially below the rate proportionate to possible energization of the slave motor 69 without locking the rear wheels. Assuming that there are two or three passengers in the back seat of a passenger vehicle, the conventional means associated with the air suspension unit 128 will compensate for the additional load by increasing the air pressure in such unit. Such pressure will be communicated through the line 127 to the chamber 126 to move the diaphragm 121 toward the right to tilt the plate 112 and U-tube 106 clockwise about the pivot 103. This movement increases the distance between the contact 110 and the surface of the mercury in the right leg of the tube 106. Thus it requires a greater rate of vehicle deceleration to close the circuit for the solenoid 102 at the contact 110, and thus the slave motor will be energized to a greater extent. The degree of tilting of the plate 112 and tube 106 will depend upon the pressure in the air suspension unit 128, and such pressure in turn will depend upon the loading of the vehicle. Thus, as the vehicle is progressively loaded, the valve 99 will be closed at a higher rate of vehicle deceleration, which is permissible without the locking of the rear wheels of the motor vehicle. With the present system, therefore, the maximum possible braking action is provided under all conditions of loading of the vehicle.

From the foregoing, it will be apparent that the present system operates under all load conditions to provide the greatest possible braking action without locking and sliding the rear wheels of the vehicle. Such locking and sliding is highly disadvantageous since braking action is lost when rear wheel traction is lost, and the locking of the rear wheels results in unnecessarily wearing the rear tires of the vehicle, causing flat spots and wheel unbalance. The system, therefore, is highly efficient for its intended purpose.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake system comprising a master cylinder connected to the forward set of vehicle wheel cylinders, a master cylinder connected to the rear set of vehicle wheel cylinders, a plunger movable in each master cylinder for displacing fluid into the associated set of wheel cylinders, a fluid pressure motor connected to each of said plungers to effect movement thereof, a valve mechanism having connection with a source of relatively high pressure and having connections to said motors to supply pressure fluid thereto to operate them, said connections including a control line leading to one of said motors, a normally open valve in said control line, means responsive to vehicle deceleration when the vehicle brakes are applied for closing said valve to limit energization of said one motor, and means responsive to increasing loads in the vehicle for rendering said last-named means responsive to higher rates of vehicle deceleration.

2. A booster brake system according to claim 1 wherein each motor has a variable pressure chamber, said one motor being a slave motor and said control line being connected between the variable pressure chambers of the two motors, said valve mechanism being connected between said source aid the variable pressure chamber of the other motor.

3. A booster brake system according to claim 1 wherein said deceleration responsive means comprises a normally open mercury switch mounted for turning movement on an axis transverse to the vehicle, said means responsive to increasing loading of the vehicle comprising means for tilting said mercury switch to require a greater degree of vehicle deceleration for the closing of said switch.

4. A booster brake system comprising a master cylinder connected to the forward set of vehicle wheel cylinders, a master cylinder connected to the rear set of vehicle wheel cylinders, a plunger movable in each master cylinder for displacing fluid into the associated set of wheel cylinders, a fluid pressure motor connected to each of said plungers to effect movement thereof, a valve mechanism having connection with a source of relatively high pressure and having connections to said motors to supply pressure fluid thereto to operate them, said connections including a control line leading to one of said motors, a normally open valve in said control line, a solenoid energizable for closing said valve, a circuit for said solenoid including a normally open mercury switch containing a body of mercury having a normal level and a contact arranged above said level to provide a normal gap adapted to be closed by inertia incident to vehicle deceleration when the brakes are applied, and means responsive to increased loading of the vehicle for increasing said gap whereby said mercury switch will close at higher deceleration rates as the loading of the vehicle increases.

5. A booster brake system according to claim 4 wherein said mercury switch is mounted for turning movement about an axis transverse to the vehicle, and means biasing said switch to a normal position, said means responsive to increased loading of the vehicle overcoming said biasing means to turn said mercury switch to increase said gap.

6. A booster brake system according to claim 4 wherein said mercury switch is mounted for turning movement about an axis transverse to the vehicle, and means biasing said switch to a normal position, said means responsive to increased loading of the vehicle comprising a fluid pressure motor connected to said switch and subject to increased pressure to overcome said biasing means as the loading of the vehicle increases.

7. In a booster brake system for a motor vehicle having an air suspension device for one end of the vehicle in which air pressures are increased when the vehicle loading increases, in combination, a master cylinder connected to the forward set of vehicle wheel cylinders, a master cylinder connected to the rear set of wheel cylinders, a plunger movable in each master cylinder for displacing fluid into the associated set of wheel cylinders, a fluid pressure motor connected to each of said plungers to effect movement thereof, a valve mechanism having connection with a source of relatively high pressure and having connections to said motors to supply fluid thereto to operate them, said connections including a control line leading to the one of said motors for applying the brakes at said end of the vehicle, a normally open valve in said control line, means responsive to vehicle deceleration when the vehicle brakes are applied for closing said valve to limit energization of said one motor, and means responsive to increasing pressures in said air suspension device for rendering said last-named means responsive to higher rates of vehicle deceleration.

8. A booster brake system according to claim 7 wherein each motor has a variable pressure chamber, said one motor being a slave motor and said control line being connected between the variable pressure chambers of the two motors, said valve mechanism being connected between said source and the variable pressure chamber of the other motor.

9. A booster brake system according to claim 7 having a brake pedal, means connected between said brake pedal and said valve mechanism for operating the latter and connected to the master cylinder plunger associated with the other motor for transmitting direct pedal forces to such master cylinder plunger, said one motor being a slave motor and said control line being connected to said one motor to operate the associated plunger solely in accordance with the energization of said one motor.

10. A booster brake system according to claim 7 having a brake pedal, means connected between said brake pedal and said valve mechanism for operating the latter and connected to the master cylinder plunger associated with the other motor for transmitting direct pedal forces to such master cylinder plunger, each motor having a variable pressure chamber, said one motor being a slave motor and said control line being connected between the variable pressure chambers of the two motors, said valve mechanism being connected between said source and the variable pressure chamber of said other motor.

11. A booster brake system according to claim 7 wherein said deceleration responsive means comprises a normally open mercury switch connected to said valve and energizable for closing it, said switch being mounted for turning movement on an axis transverse to the vehicle to increase the rate of vehicle deceleration at which said switch will close, said means responsive to increasing pressures in said air suspension device comprising a pressure responsive device having fluid connection with said air suspension device and mechanically connected to said mercury switch to tilt it about said axis.

12. In a booster brake system for a motor vehicle having an air suspension device for one end of the vehicle in which air pressures are increased when the vehicle loading increases, in combination, a master cylinder connected to the forward set of vehicle wheel cylinders, a master cylinder connected to the rear set of wheel cylinders, a plunger movable in each master cylinder for displacing fluid into the associated set of wheel cylinders, a fluid pressure motor connected to each of said plungers to effect movement thereof, a valve mechanism having connection with a source of relatively high pressure and having connections to said motors to supply fluid thereto to operate them, said connections including a control line leading to the one of said motors for applying the brakes at said end of the vehicle, a normally open valve in said control line, a solenoid energizable for closing said valve, a circuit for said solenoid including a normally open mercury switch containing a body of mercury having a normal level and a contact arranged above such level to provide a normal gap adapted to be closed by inertia incident to vehicle deceleration when the brakes are applied, and means responsive to increasing pressures in said air suspension device for increasing said gap whereby said mercury switch will close at higher deceleration rates as said air pressure increases.

13. A booster brake system according to claim 12 wherein said mercury switch is mounted for turning movement about an axis transverse to the vehicle, and means biasing said switch to a normal position to tend to maintain said gap normal, said means responsive to increasing air pressures in said air suspension device comprising a pressure responsive device having fluid connection with said air suspension device and having mechanical connection with said switch to turn it about said axis.

14. A booster brake system according to claim 12 wherein said mercury switch is mounted for turning movement about an axis transverse to the vehicle, and means biasing said switch to a normal position to tend to maintain said gap normal, said means responsive to increasing air pressures in said air suspension device comprising a fluid pressure motor having a pressure responsive element connected to said switch and having a pressure chamber at one side thereof in fluid communication with said air suspension device.

References Cited in the file of this patent

UNITED STATES PATENTS 2,082,026   Powers _____ June 1, 1937